B. GARRISON.
FLEXIBLE POWER TRANSMISSION.
APPLICATION FILED FEB. 4, 1919. RENEWED APR. 30, 1920.
1,428,586.
Patented Sept. 12, 1922.
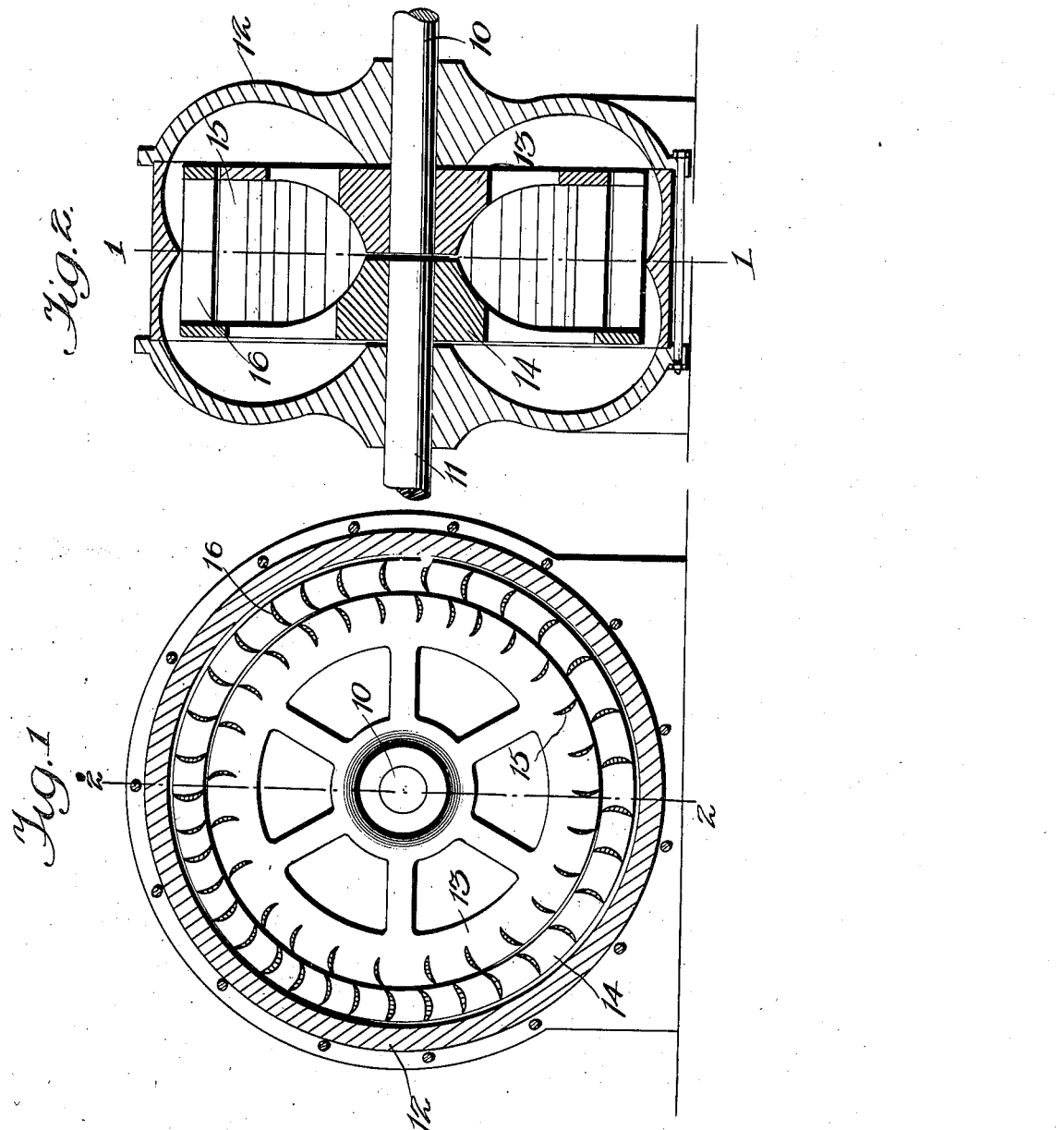
WITNESSES
George C. Myers
INVENTOR
BENJAMIN GARRISON,
BY Munn & Co.
ATTORNEYS Patented Sept. 12, 1922.

1,428,586

UNITED STATES PATENT OFFICE.

BENJAMIN GARRISON, OF MORGANTOWN, WEST VIRGINIA.

FLEXIBLE POWER TRANSMISSION.

Application filed February 4, 1919, Serial No. 274,853. Renewed April 30, 1920. Serial No. 378,012.

*To all whom it may concern:*

Be it known that I, BENJAMIN GARRISON, a citizen of the United States, and a resident of Morgantown, in the county of Monongahela and State of West Virginia, have invented certain new and useful Improvements in Flexible Power Transmissions, of which the following is a specification.

My present invention relates generally to the transmission of power from its source to any desired mechanism and more particularly to a transmission device for transmitting such power in a flexible manner, and one in which the driving member may be run at any desired speed and rotation of the driven member effected, either in a reduced or advanced relation as to speed, depending upon the amount of pull required thereof or the load carried thereby.

A further object of my invention is the provision of a simple, inexpensive, flexible transmission especially adaptable for use in connection with automobiles and motor cars and for operation either with or without means operating as a direct clutch between the driving and driven members.

In the accompanying drawing illustrating the present embodiment of my invention, Figure 1 is a central, transverse vertical section through my improved transmission taken substantially on the line 1—1 of Figure 2, and Figure 2 is a vertical longitudinal section taken through my improved transmission substantially on line 2—2 of Figure 1.

Referring now to these figures, I have illustrated driving and driven members in the form of shafts 10 and 11 respectively, disposed in axially alined relation with their adjacent ends terminating in spaced relation within a fluid casing 12 through the side walls of which the adjacent ends of the shafts 10 and 11 are journaled.

Within the casing 12 which is made fluid tight to hold any suitable transmission fluid, the respective ends of the shafts 10 and 11 are provided with wheels 13 and 14 in opposing spaced relation, having annular series of blades or vanes 15 and 16.

By reference to Figure 1 in particular, it will be noted that the annular series of blades 16 of the driven wheel 14 is spaced a greater distance from the axes of the shafts 10 and 11 than the blades 15 of the driving wheel 13, so that the two series of blades 15 and 16, each of which projects toward the opposing wheel, thus overlap in the space between the wheel so that when the shaft 10 rotates, the centrifugal force will be applied through the motion of the transmission fluid to the blades 16 of the wheel 14 and thus rotate the driven shaft 11 in proportion to the speed of shaft 10, depending upon the resistance to the rotation of the driven shaft, that is the load it must overcome.

It is obvious that my invention, the most simple form of which is shown, is capable of various modifications as well as of use either with or without other means forming for instance a direct connection at times between the driving and driven shafts, and it is further obvious that by the use of my improvement a flexible transmission is had in which the speed of the driving shaft may be increased or decreased at will, and rotation imparted to the driven shaft proportional to the speed of the driving shaft and depending only upon the amount of resistance it must overcome, due to its load. It will also be observed that the side walls of the casing are formed with inner annular cavities at the sides of the wheels 13 and 14 and around the hubs of these wheels and the hub portions of the casing sides, so that an annular fluid channel is thus formed around the thickened hub portions of the wheels, the latter of which take up the space between the hub portions of the side plates.

I claim:

A flexible fluid transmission comprising the combination of driving and driven shafts, a fluid casing into which the adjacent ends of the shafts extend including side plates having cavities around the hub portions thereof forming an annular fluid channel, a transmission fluid within the channel of said casing, opposing wheels of similar construction secured in laterally spaced relation on the shaft ends within the casing having thickened hubs between the hub portions of the casing side plates, annular series of blades carried by said wheels and each blade extending in an approximately straight line at right angles to its wheel and toward the other wheel, said series of blades being arranged at different distances from the axes of the said shafts and overlapping one another in the space between the wheels.

BENJAMIN GARRISON.

Witnesses:
 WALTER J. MOORE,
 CHAS. G. BAKER.